United States Patent [19]
Nakai

[11] Patent Number: 5,075,806
[45] Date of Patent: Dec. 24, 1991

[54] TAPE RECORDER WITH COMPACT CASSETTE RETAINER AND MANUALLY OPERABLE CASSETTE EJECTOR

[75] Inventor: Hiromi Nakai, Ohmiya, Japan

[73] Assignee: Asahi Corporation, Saitama, Japan

[21] Appl. No.: 258,716

[22] Filed: Oct. 17, 1988

[30] Foreign Application Priority Data

Feb. 16, 1988 [JP] Japan .................................. 63-18844
Feb. 16, 1988 [JP] Japan .................................. 63-18845
Feb. 16, 1988 [JP] Japan .................................. 63-18846

[51] Int. Cl.⁵ ......................................... G11B 15/675
[52] U.S. Cl. ................................................ 360/96.5
[58] Field of Search ....................... 360/93, 96.5, 96.6; 242/197

[56] References Cited

U.S. PATENT DOCUMENTS 4,841,394 6/1989 Tomizawa et al. ................ 360/96.5

Primary Examiner—Robert S. Tupper
Attorney, Agent, or Firm—Rodman & Rodman

[57] ABSTRACT

The present invention relates to a tape recorder utilizing a cassette with a built-in endless micro tape.

In the tape recorder of the present invention, a cassette retainer is provided in one half of the case, and cassette retaining side walls are provided in the other half of the case in such a manner as to become flush with the side walls of the cassette retainer, and a dust cover is formed in such a manner as to become flush with the bottom wall of the cassette retainer when the cassette is inserted.

In addition, an ejecting lever is slidably mounted on one of the sides of the case, and the cassette retained in the cassette retainer is ejected from the case by the ejecting lever.

Furthermore, a changeover switch is provided in such a manner as to be electrically connected with a head for reading recorded signals on the tracks, and reading of the recorded signals on a desired track can be achieved by changing over the changeover switch.

7 Claims, 4 Drawing Sheets

TAPE RECORDER WITH COMPACT CASSETTE RETAINER AND MANUALLY OPERABLE CASSETTE EJECTOR

FIELD OF THE INVENTION

The present invention relates to a small tape recorder utilizing a cassette with a built-in endless micro tape, and more particularly to a cassette retaining mechanism, cassette ejecting mechanism and track selecting mechanism thereof.

BACKGROUND OF THE INVENTION

Tape recorders utilizing cassettes with built-in endless micro tapes have already been introduced. In the tape recorders of this type, a cassette is inserted deep into a case of the tape recorder until the rear end face of the cassette reaches the vicinity of the open end of a dust cover and is then retained to be fixed in a cassette retainer disposed in the case.

Such a conventional cassette retaining construction involves the drawback that redundant space is left between a cassette insertion port and the rear end face of the cassette when the cassette has been inserted deep into and retained in the case in the above mentioned manner, which inevitably increases the width of such tape recorders.

Furthermore, the tape recorders of this conventional type are equipped with an ejecting mechanism as a means for removing a cassette inserted in the case.

With one of the conventional ejecting mechanisms that has been introduced, a cassette is automatically ejected from the case by pressing an ejecting button. The ejecting mechanism of this type, however, involves the drawback that the ejecting mechanism itself is complicated, resulting in a high manufacturing cost.

Micro tapes have provided thereon a continuous linear portion, that is, a track, that can be read by one head. The number of tracks provided on each tape may be only one, or a plurality of tracks may be provide thereon transversely. In the latter case, selection of the tracks has conventionally been achieved by moving the head transversely of the tape.

However, since tape recorders adopting micro tapes are miniaturized, it is extremely difficult to provide in such a limited space a mechanism for moving the head and to provide space in which the head can move.

SUMMARY OF THE INVENTION

A first object of the present invention is to provide a tape recorder having a cassette retaining mechanism which enables a reduction to be made in the width of the tape recorder.

To attain the above object, the present invention provides a tape recorder which not only utilizes a cassette with a built-in endless micro tape and has a dust cover mounted at a cassette insertion port thereof in such a manner as to be openable and closeable, but also includes a retaining structure wherein a substantially U-shaped cassette retainer for retaining the cassette at its sides and bottom is provided in one half of the case, and cassette retaining walls are provided in the other half of the case in such a manner as to be continuous with a cassette insertion port, which cassette retaining walls are formed in such a manner as to be flush with the side walls of the cassette retainer. In addition, the dust cover used is also formed in such a manner as to become flush with the bottom wall of the cassette retainer when the cassette is inserted thereinto.

With the configuration described above, a cassette is designed to be held at its sides and bottom by the cassette retainer with the cassette retaining side walls provided in such a manner as to fit in the space between the cassette retainer and the cassette insertion port and the dust cover, and the rear end face of the cassette is designed to be located in the vicinity of the cassette insertion port when the cassette is set in the case. This serves to eliminate the redundant space that would otherwise be left behind the rear end face of the cassette. This in turn allows the width of the tape recorder to be reduced.

A second object of the present invention is to provide a tape recorder having an ejecting mechanism which is mechanically simple and inexpensive to produce.

To attain the above second object, the present invention provides a tape recorder which as well as utilizing a cassette with a built-in endless micro tape is provided with an ejecting mechanism with an ejecting lever which is slidably mounted on one of the sides of the case and has a rib adapted to be slidably fitted in a guide slot formed in the cassette retainer disposed in the case, wherein the cassette retained in the cassette retainer is ejected therefrom by the rib of the ejecting lever.

With the ejecting mechanism described above of the present invention, the cassette inserted and disposed in the cassette retainer is ejected from the case by the manually operated mechanism. This results in a simple ejecting mechanism and hence helps to enable the manufacture of tape recorders inexpensively.

A third object of the present invention is to provide a tape recorder having a track selecting mechanism in which the selection of tracks may be achieved without moving the head.

To attain the above third object, the present invention provide a tape recorder which as well as utilizing a cassette with a built-in endless micro tape having a plurality of tracks includes a track selecting mechanism configured in such a manner that a changeover switch is provided which is electrically connected to a head for reading recorded signals on the tracks and that reading of the recorded signals on a desired track may be achieved by changing over the changeover switch.

With the track selecting mechanism described above of the present invention, since the tracks can be changed over by changing over the changeover switch which is electrically connected to the head, selection of the desired track can be achieved with the head fixed.

DETAILED DESCRIPTION OF THE INVENTION

Figure 3:
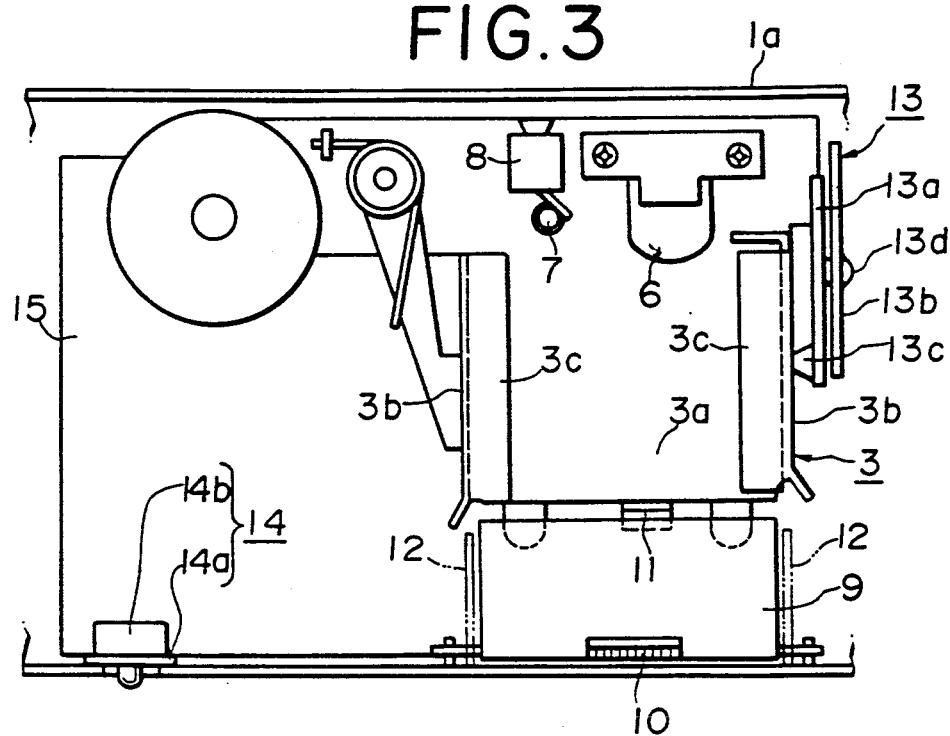
FIG. 3 is a plan view of one half of a case of the same tape recorder.
Figure 4:
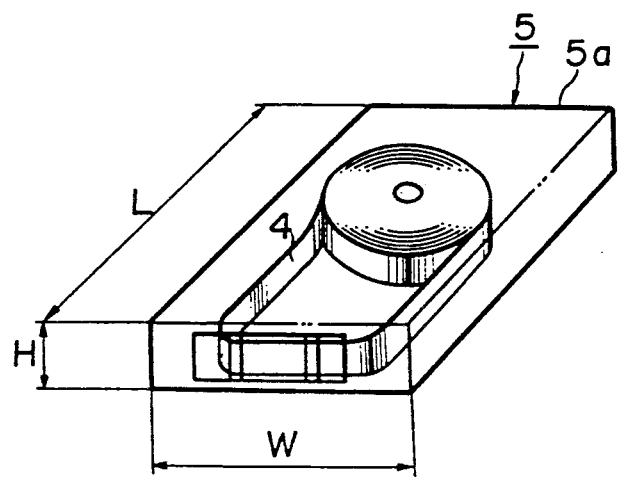
FIG. 4 is a perspective view of a cassette.

A case 1 is constructed in such a manner as to be divided in two halves; one half 1a and the other half 1b of the case are brought together to form a box-like case 1. A metal cassette retainer 3 is fixed on one half 1a of the case at a position slightly away from a cassette insertion port 2. The cassette retainer 3 comprises a bottom wall 3a and side walls 3b provided on the sides of the bottom wall 3a in such a manner as to stand erect therefrom and is configured in such a manner as to form a substantially U shape. The side walls 3b provided on the sides of the bottom wall 3a in the above mentioned manner are constructed in such a manner that the distance between them substantially corresponds to the width W of a cassette 5 with a built-in endless micro tape 4, which is shown in FIG. 4, so that the sides of the cassette 5 are retained by the side walls 3b. In addition, the upper end portions of the side walls 3b are bent inwardly at a right angle to form bent portions 3c (refer to FIG. 3) in such a manner that the distance between the bent portions 3c and the bottom wall 3a substantially corresponds to the height H of the cassette 5 so that the top and bottom of the cassette 5 are retained by the bent portions 3c and the bottom wall 3a. Reference numeral 6 denotes a head 6 for reading recorded signals on a track or tracks of the endless micro tape 4 and this head is fixed in the one half 1a of the case 1 at such a position as to stay in the vicinity of the front end of the cassette retainer 3. Reference numeral 7 denotes a capstan for taking up the endless micro tape 4, and reference numeral 8 denotes a main switch designed to be automatically switched on when the cassette 5 is inserted into and retained in the cassette retainer 3.

The cassette insertion port 2 is designed to be covered by a dust cover 9 which can be opened and/or closed and which is rotatably pivotably attached to the one half 1a of the case 1. The dust cover 9 is constantly biased by the elastic force of a spring 10 in the direction in which the cassette insertion port 2 is closed. The dust cover 9 is constructed in such a manner that it is, as shown in dashed lines 9' in FIG. 2 and in solid lines in FIG. 3, pushed down, comes into abutment with a stopper 11 provided on the bottom wall 3a in such a manner as to be integral therewith, and becomes flush with the bottom wall 3a of the retainer 3 when the cassette 5 is inserted from the cassette insertion port 2 and is retained in the cassette retainer 3. When the cassette 5 has been inserted and loaded in the case 1, the dust cover 9 serves to retain the cassette 5 at its rear end bottom portion. On the other hand, a pair of side walls 12 (refer to FIGS. 2 and 3) are integrally provided on the inner side of the other half 1b of the case 1 in such a manner that they are positioned on the sides of the dust cover 9 when the cover 9 has been pushed down and is open as described above. In addition, the side walls 12 are constructed in such a manner as to become flush with the side walls 3b of the cassette retainer 3. These side walls 12 serve to retain the cassette 5 at its rear end side portions when the cassette 5 has been inserted and loaded in the case 1.

Figure 1:
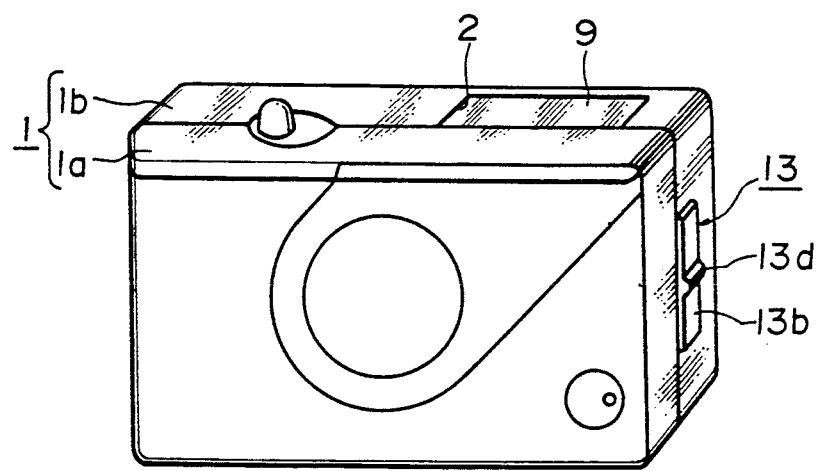
FIG. 1 is a perspective view of a tape recorder in which a cassette retaining structure according to the present invention is adopted.
Figure 2:
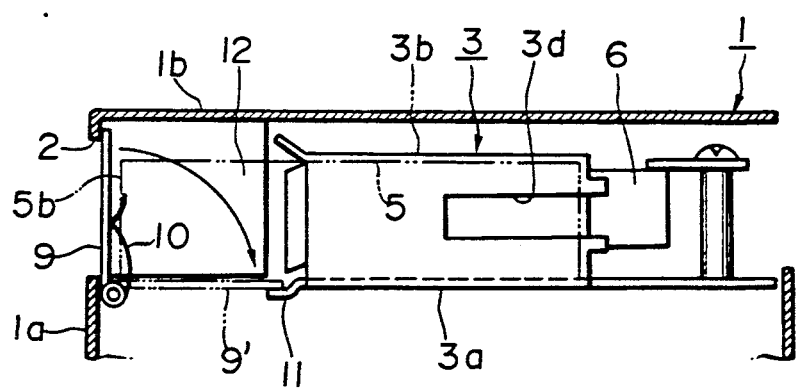
FIG. 2 is a sectional side elevation of the main part of the same tape recorder.
Figure 5:
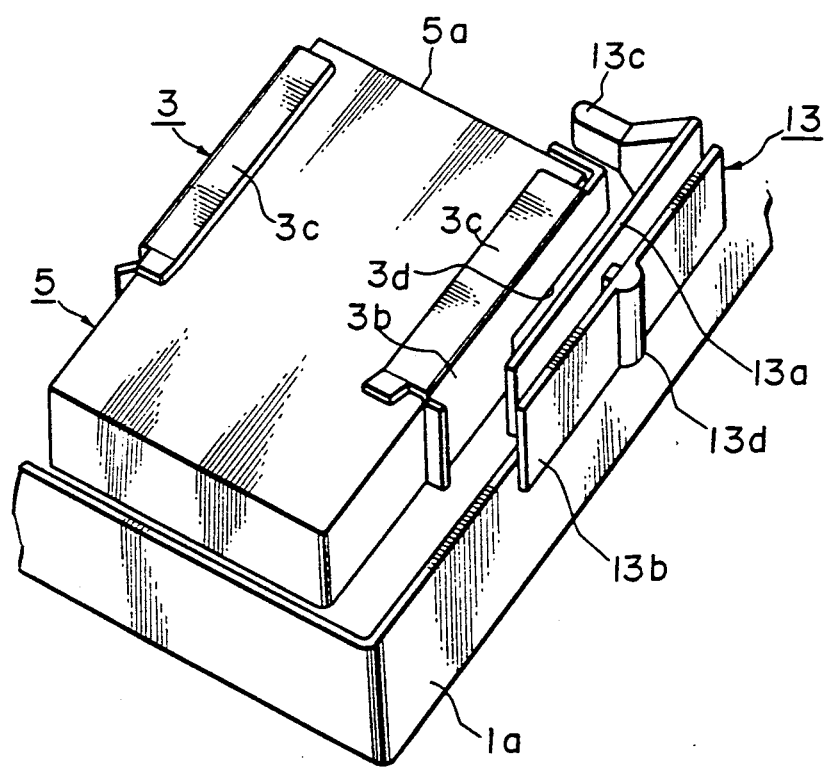
FIG. 5 is a perspective view of the main part of the tape recorder according to the present invention.

As shown in FIGS. 2 and 5, a guide slot 3d is provided in one of the side walls 3b of the cassette retainer 3 so as to form a rectangular slot extending a given length rearwardly from the front end of the same one of the walls 3b. In addition, an ejecting lever 13 is slidably provided on the side of the other half 1b of the case 1 which corresponds to the one of the side walls 3b in which the guide slot 3d is formed. The ejecting lever 13 is composed of two plates 13a and 13b, which are designed to slide along the relevant side of the other half 1b of the case 1 with the same side placed therebetween. Provided on the inner face on the front end side of the plate 13a of the ejecting lever 13 is a rib 13c which is designed to slidably move along in the guide slot 3d and which extends inwardly through the guide slot 3d to the position where its tip portion reaches the inside of the cassette retainer 3, and the cassette 5 retained in the cassette retainer 3 is ejected from the case 1 by this rib 13c. In other words, the cassette 5 is ejected from the case 1 is such a manner that the rib 13c comes into abutment with the front end face 5a of the cassette 5 when the cassette 5 is inserted into the cassette retainer 3, and when the ejecting lever 13 is caused to move so as to eject the cassette 5, the rib 13c is adapted to synchronously press the front end face 5a of the cassette 5 towards the side of the cassette insertion port 2, the cassette 5 being thus ejected from the case 1 by this pressing force. On the other hand, a finger lug 13d for sliding the ejecting lever 13 is provided on the exterior face of the other plate 13b of the ejecting lever 13.

Figure 6:
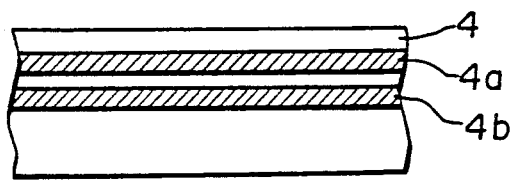
FIG. 6 is an enlarged plan view of a endless micro tape.
Figure 7:
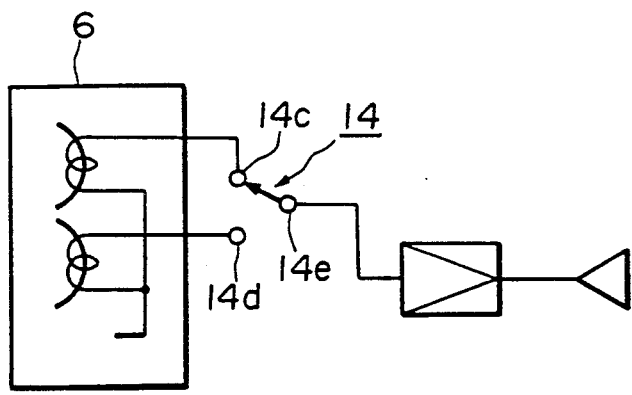
FIG. 7 is an electric circuit diagram for use in a track selecting mechanism according to the present invention.

As shown in FIG. 6, two tracks 4a and 4b are formed on the endless micro tape 4 in the transverse direction of the tape 4, and the recorded signals on the tracks 4a and 4b are designed to be read by the head 6 (refer to FIG. 3) arranged in the vicinity of the front end portion of the cassette retainer 3. On one of the sides of the one half 1a of the case 1, a moving element 14a which forms a changeover switch 14 is slidably mounted and a stationary element 14b connected face to face with the moving element 14a is fixed on a printed board 15 and is further electrically connected to the head 6 via wiring (not shown) formed on the printed board 15 (refer to FIG. 7). In addition, the stationary element 14b has two contacts 14c and 14d provided thereon which correspond to the tracks 4a and 4b. These contacts 14c and 14d are designed to alternately contact a contact 14e of the moving element 14a.

In the structure described above, when the cassette 5 is inserted through the cassette insertion port 2, the dust cover 9 is first pushed down toward the inside of the case 1 and opened to become flush with the bottom wall 3a of the cassette retainer 3. The cassette 5 may continue to be inserted further into the case 1 while sliding on the dust cover 9 and the bottom wall 3a until the cassette 5 comes into abutment with the head 6 and a capstan 7 at its front end, whereby the forward movement of the cassette 5 is checked and the cassette 5 becomes properly set in the case 1. In this condition, the cassette 5 is held at its sides by the side walls 3b of the retainer 3 and the side walls 12 integrally provided in the other half 1b of the case 1 and also held at its bottom by the bottom wall 3a of the cassette retainer 3 and the dust cover 9. In this condition, the dust cover 9 is biased in the counter-clockwise direction by the elastic force of a spring 10, whereby the dust cover 9 is pressed against the bottom of the cassette 5. When the cassette 5 is fully inserted into the case 1, the rear end face 5b of the cassette 5, as shown in FIG. 2, comes to be located in the vicinity of the cassette insertion port 2 with no redundant space left between the cassette insertion port 2 and the rear end face 5b of the cassette 5. Thus, the width of the tape recorder can be reduced to a remarkable extent.

Furthermore, in the ejecting mechanism configured as described above, the ejecting lever 13 which is designed to eject the cassette 5 from the case 1 through its sliding action as mentioned above is designed to stay at the rear end of the guide slot 3d with its rib 13c bearing against the rear end face of the slot 3d before the cassette 5 is loaded in the case 1. In this condition, the front end face 5a of the cassette 5 is brought into abutment with the rib 13c of the ejecting lever 13 when the cassette 5 is inserted into the cassette retainer 3 through the cassette insertion port 2, and the ejecting lever 13 is caused to travel forward as the cassette is inserted deeper into the retainer 3. In the condition achieved when insertion of the cassette 5 is completed, the rib 13c of the ejecting lever 13 is in abutment with front end face 5a of the cassette 5 and immovable in this position. Therefore, when trying to eject the cassette 5 loaded in the case 1 therefrom, the ejecting lever 13 may be slid in the reverse direction so that the rib 13c of the ejecting lever 13 presses the front face end 5a of the cassette 5 toward the side of the cassette insertion port 2, whereby the cassette 5 is easily removed from the case 1.

The track selecting mechanism will now be described. When the cassette 5 is inserted through the cassette insertion port 2 and is retained in the cassette retainer 3, a main switch 8 is switched on by the cassette 5. This activates the endless micro tape 4 in the cassette 5, and a pre-selected track, either 4a or 4b, is read by the head 6. The moving elements 14a of the changeover switch 14 may be activated when the track to be read by the head 6 is changed over from 4a to 4b, or from 4b to 4a. When the position of the changeover switch 14 is changed in the above mentioned manner, the contacting condition of the contact 14e of the moving element 14a with the contact 14c or 14d of the stationary element 14b is also changed, whereby the track to be read by the head 6 is changed from 4a to 4b, or vice versa. Thus it is possible to easily select at will the desired track 4a or 4b through the action of the moving element 14a of the changeover switch 14.

Figure 8:
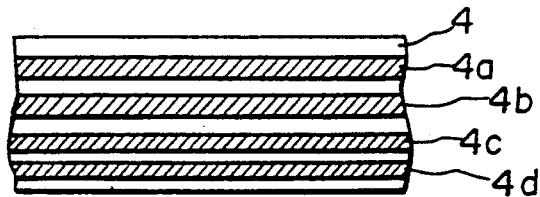
FIG. 8 is an enlarged plan view showing another embodiment of the endless micro tape.

Although two tracks are formed on the micro endless tape 4 in the above described embodiment, the number of tracks formed on the tape is not necessarily limited to two, and the tape 4 may, for instance, be configured in such a manner that four tracks (4a to 4d) are formed thereon in the transverse direction of the tape as shown in FIG. 8.

As described above, with the present invention, the cassette with a built-in endless micro tape is designed to be rigidly held at its sides and bottom by the cassette retainer with the cassette retaining side walls provided in such a manner as to fit in the space between the cassette retainer and the cassette insertion port and the dust cover, and the rear end face of the cassette is designed to be located in the vicinity of the cassette insertion port when the cassette is set in the case. This serves to eliminate the redundant space which is left behind the rear end face of the cassette with conventional tape recorders. This allows the width of tape recorders to be reduced to an remarkable extent. Thus, the present invention meets the demand for smaller tape recorders.

In addition, in the present invention, the ejecting lever is slidably mounted on one of the sides of the case, and the rib of the ejecting lever is designed to press the front end face of the cassette inserted and disposed in the cassette retainer to thereby eject it from the case. This serves to make the ejecting mechanism simpler as compared with those of conventional tape recorders and therefore advantageously helps to reduce the manufacturing cost.

Furthermore, in the present invention, a changeover switch is provided which is electrically connected to the head for reading the signals recorded on the tracks, and by changing over the changeover switch the tracks may be selected at will so as to allow reading of recorded signals as desired. This enables selection of the desired track with the head fixed and hence without moving the head transversely of the tape. In this sense, too, the present invention offers the advantage that the selection of tracks may be easily achieved by incorporating this mechanism in a tape recorder, even if such a tape recorder is a small one utilizing endless micro tapes.

What is claimed is:

1. A tape recorder for a cassette having cassette sidewalls, a cassette bottom and an endless micro tape comprising, a housing with a cassette insertion port, a dust cover member pivotally mounted to the housing at the cassette insertion port so as to be pivotable between a predetermined open limit position wherein said insertion port is open and a predetermined closed limit position wherein said insertion port is closed, a substantially U-shaped cassette retainer within said housing for retaining the cassette, said cassette retainer including opposite retainer side walls and a retainer bottom wall formed such that he retainer side walls are engagable with the cassette side walls and the retainer bottom wall is engagable with the cassette bottom, said housing including two half cases, the U-shaped cassette retainer being provided in one of the case halves and the other half case including side walls proximate with and extending from the cassette insertion port in respective alignment with the retainer side walls, and said dust cover member is pivotally movable inwardly from said closed limit position to said open limit position, such that when said cover member is in said open limit position it is flush with the bottom of said cassette retainer and engagable with the cassette bottom to support the cassette bottom when such cassette is inserted into the housing through the cassette insertion port.

2. A tape recorder for a cassette having cassette sidewalls, a cassette bottom and an endless micro tape comprising, a housing with a cassette insertion port, a dust cover member pivotally mounted to the housing at the cassette insertion port so as to be pivotable between a predetermined open limit position wherein said insertion port is open and a predetermined closed limit position wherein said insertion port is closed, a substantially U-shaped cassette retainer within said housing for retaining the cassette, said cassette retainer including opposite retainer side walls and a retainer bottom wall formed such that the retainer side walls are engagable with the cassette side walls and the retainer bottom wall is engagable with the cassette bottom, said housing including two half cases,, the U-shaped cassette retainer being provided in one of the case halves and the other case half including insertion port side walls proximate with and extending from the cassette insertion port in respective alignment with the retainer side walls, and said dust cover member is pivotally movable inwardly from said closed limit position to said open limit position such that when said cover member is in said open limit position it is flush with the bottom of said cassette retainer and engagable with the cassette bottom to support the cassette bottom when such cassette is inserted into the housing through the cassette insertion port, and wherein a biasing spring is engagable with said dust cover member to constantly bias said dust cover member toward the closed limit position.

3. A tape recorder for a cassette having cassette sidewalls, a cassette bottom and an endless micro tape comprising, a housing with a cassette insertion port, a dust cover member pivotally mounted to the housing at the cassette insertion port so as to be pivotable between a predetermined open limit position wherein said insertion port is open and a predetermined closed limit position wherein said insertion port is closed, a substantially U-shaped cassette retainer within said housing for retaining the cassette, said cassette retainer including opposite retainer side walls and a retainer bottom wall formed such that the retainer side walls are engagable with the cassette side walls and the retainer bottom wall is engagable with the cassette bottom, said housing including two half cases, the U-shaped cassette retainer being provided in one of the case halves and the other case half including insertion port side walls proximate with the extending from the cassette insertion port in respective alignment with the retainer side walls, and said dust cover member is pivotally movable inwardly from said closed limit position to said open limit position such that when said cover member is in said open limit position it is flush with the bottom of said cassette retainer and engagable with the cassette bottom to support the cassette bottom when such cassette is inserted into the housing through the cassette insertion port, and wherein a stop portion is integrally provided on the retainer bottom wall and is formed such that said dust cover member abuts said stop portion and is flush with the retainer bottom wall when said dust cover member is moved to said open limit position upon insertion of said cassette into said housing through said cassette insertion port.

4. A tape recorder for a cassette with an endless micro tape comprising, a housing with a side wall and a cassette insertion port, a cassette retainer within said housing for retaining a cassette, said cassette retainer including opposite retainer side walls, one of said retainer side walls including a guide slot, and a manually operable ejection mechanism supported on said housing, said ejection mechanism including an ejecting lever, means for slidably mounting the ejection lever on the housing side wall and a rib joined to said ejection lever to project into said guide slot for engagement with a cassette that has been inserted into the housing between the opposite retainer side walls, such that slidable movement of the ejection lever in a predetermined direction enables said rib to engage a cassette inserted in the housing, to urge the cassette out of the housing through the insertion port.

5. A tape recorder according to claim 4 wherein said ejecting lever comprises two plates and is formed to slide along the side wall of said housing with said side wall interposed between said two plates.

6. A tape recorder according to claim 5 wherein said rib is joined to one of said two plates for projection inwardly of said housing to permit engagement with a cassette inserted in said housing.

7. A tape recorder according to claim 4 wherein said ejecting lever has an exterior face and a finger lug is provided on said exterior face.

* * * * *